United States Patent
Carollo

[11] Patent Number: 6,066,036
[45] Date of Patent: May 23, 2000

[54] SEPARATING DEVICE FOR THE FILLING IN AND THE CLIPPING OF PRODUCTS WHICH MAY HAVE BEEN MELTED AND THEN RESOLIDIFIED, SOLID IN THE FORM OF A PASTE OR DENSE OF DIFFERENT SIZE

[75] Inventor: Beniamino Carollo, Zane', Italy

[73] Assignee: Torneria Meccanica di Carollo & C. s.n.c., Zane', Italy

[21] Appl. No.: 09/143,946

[22] Filed: Aug. 31, 1998

[30] Foreign Application Priority Data

Sep. 25, 1997 [IT] Italy ............................ VI97A000162

[51] Int. Cl.$^7$ .................................................. A22C 11/02
[52] U.S. Cl. .............................................. 452/35; 452/45
[58] Field of Search .................... 452/35, 45, 138

[56] References Cited

U.S. PATENT DOCUMENTS

| 3,404,430 | 10/1968 | Kielsmeier et al. | 452/35 |
| 4,110,871 | 9/1978 | Greenham et al. | 452/45 |
| 4,133,076 | 1/1979 | Kupcikevicius | 452/45 |
| 4,202,502 | 5/1980 | Laska | 452/35 |
| 4,419,790 | 12/1983 | Niedecker | 452/35 |
| 4,501,542 | 2/1985 | Nausedas | 452/35 |

FOREIGN PATENT DOCUMENTS

3522477  1/1987  Germany .................... 452/45

*Primary Examiner*—Willis Little
*Attorney, Agent, or Firm*—Bucknam and Archer

[57] ABSTRACT

A separating device for the filling in and the clipping of products which may have been melted and then resolidified, solid, in the form of a paste or dense of different size, to be interposed between the metering machine of the product to be filled in such as a machine which divides the product in different portions and the clipping machine is characterized by the fact that it has a substantially tubular structure (1) and in the proximity or at the extremity of the feeding conduit (2) of the product to be filled in (3) is provided with a plurality of cutting blades preferably in the number of two cutting blades (4) and (5). The cutting blades are disposed radially, preferably diametrically on the feeding conduit. The blades are reciprocally independent one from the other and are arranged one close to the other and at least one of the blades is capable of rotating angularly around the longitudinal axis (8) of the feeding conduit (2).

18 Claims, 3 Drawing Sheets

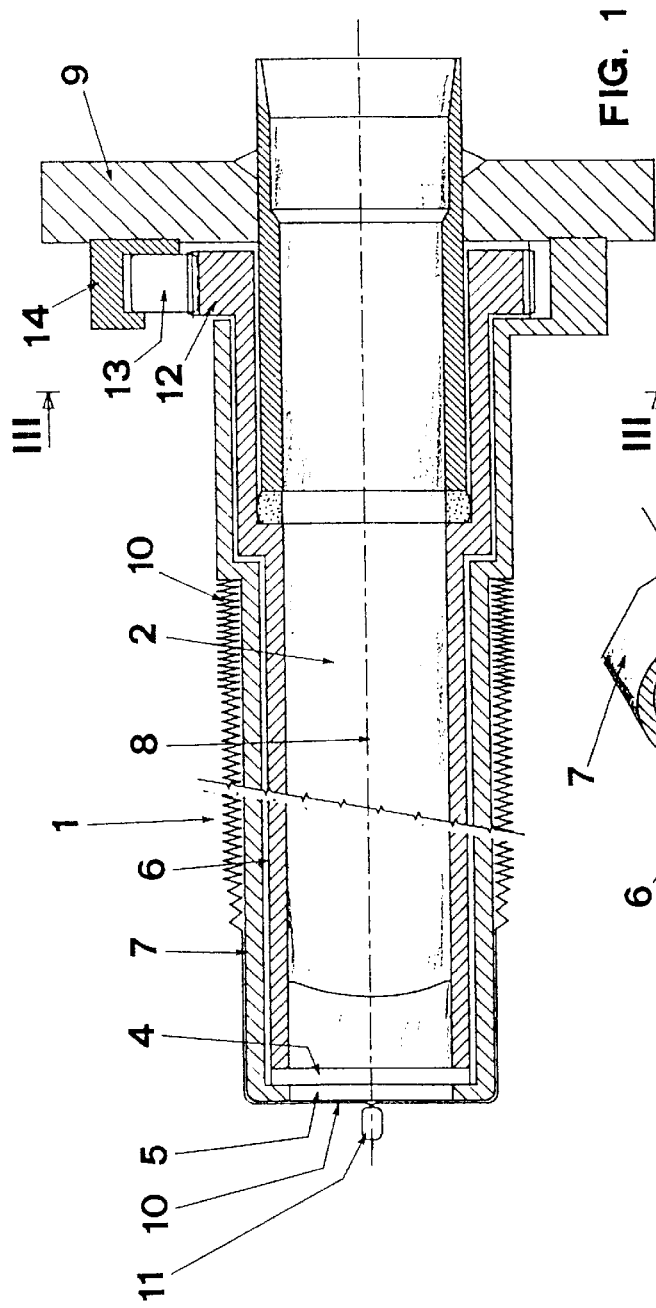
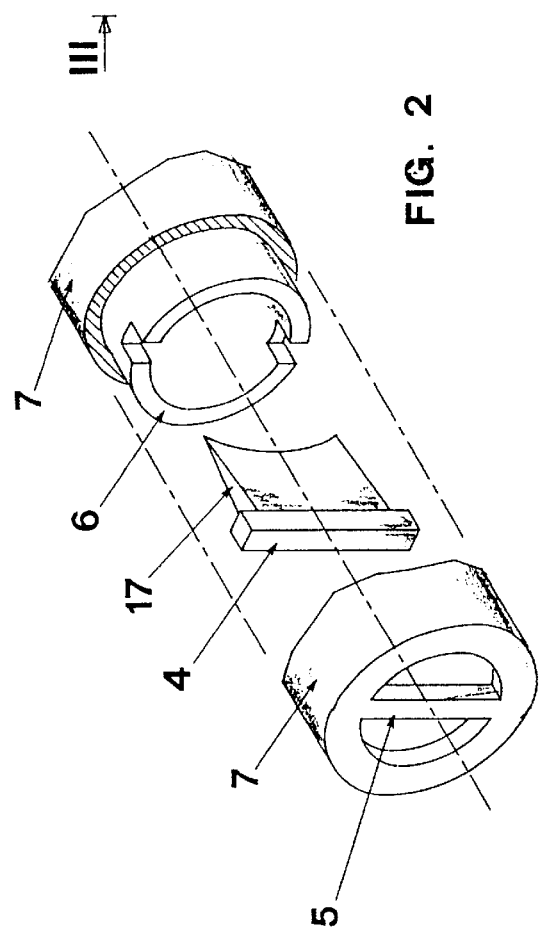

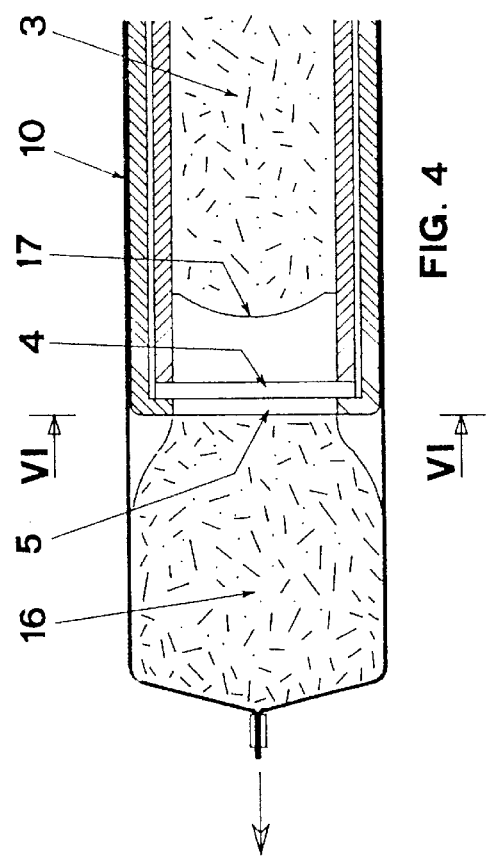
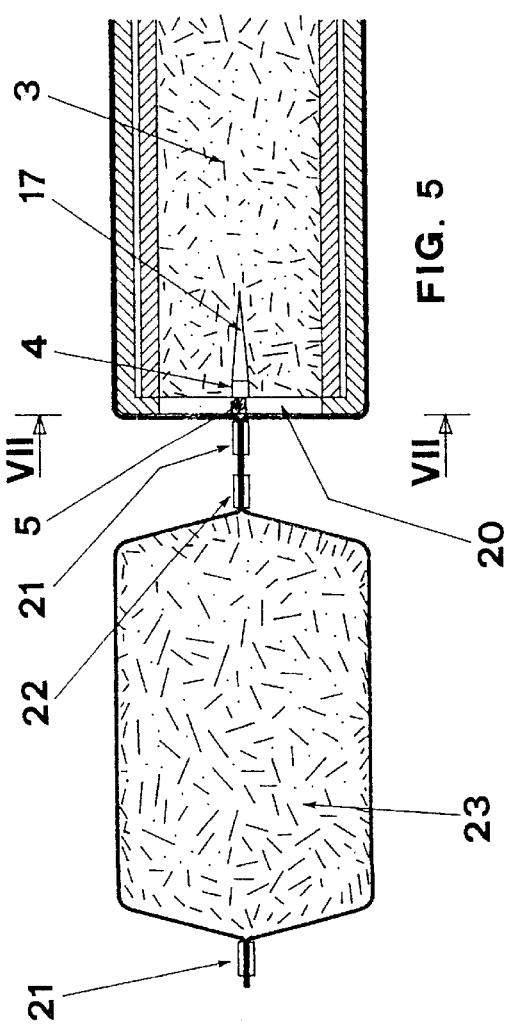
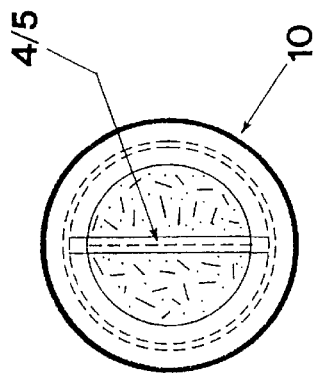
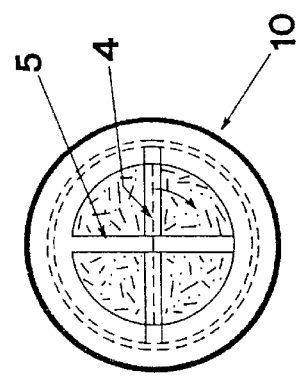

SEPARATING DEVICE FOR THE FILLING IN AND THE CLIPPING OF PRODUCTS WHICH MAY HAVE BEEN MELTED AND THEN RESOLIDIFIED, SOLID IN THE FORM OF A PASTE OR DENSE OF DIFFERENT SIZE

FIELD OF THE INVENTION

The object of the present invention is to provide a separating device to be used with machines for filling and clipping automatically products which may have solidified after having been melted, solid, in the form of a paste or dense products of different sizes.

BACKGROUND OF THE PRIOR ART

In the field of industrial packaging it is frequent to use containers with envelopes of flexible material, essentially of tubular shape, which, after they have been filled by means of a filling operation, are closed at the two ends by means of a tying or a clipping operation.

The filling operation in particular is carried out in the packaging of alimentary products and above all in the packaging of ground products based on meat to obtain the so called filled material called "insaccati", in which the envelope is constituted by a tube from the intestine of an animal referred to hereinbelow as "budello", which is filled with the paste of ground meat, for instance to prepare salami and sausages and similar material.

According to the present state of the art, the filling operation of ground meat is carried out substantially with packaging machines in which the operator inserts in the conduit being used for feeding the product to be filled in the open end of the tube containing budello while the opposite end of the same is preliminarily closed by means of a knot with a string or by a neck with a clip. After the predetermined quantity of the product is deposited in the interior of the budello the operator takes care of closing manually the end thus providing the filled product.

A drawback of the above process, both when the filling occurs manually as described hereinabove and also when the filling is carried out by means of automatic machines, resides in the fact that the closure of the container is not perfect at the end of the operation of introduction of the product in the budello and the result is an irregular clipping operation. In fact the product to be filled contains always in its interior small particles filiforms, which are constituted in the case of a meat paste, by cartilages, small pieces of nerve tissue and similar material, a lint, usually called "sfilacci". During the closing operation of the container by a clipping operation, that is by forming the neck in the terminal part of the budello, these filiform products may remain trapped in the clipping zone with the result that they protrude in part from the product which has been filled and it is not possible to achieve a regular and complete closure of the metallic strip with the result that eventually the budello may break in the clipping zone.

SUMMARY OF THE INVENTION

An object of the present invention is to describe a delivery device to be interposed between the metering machine or the machine which divides into portions the product to be filled in and the clipping machine, the device being capable of separating in a net manner and according to a plane perpendicular to the direction of advance of the product, the portion of the product already filled in from the portion to be filled, by means of a cutting action capable of breaking the filiform components of the mass of ground meat to be filled which are present in the clipping zone.

This object is achieved by means of a conduit of tubular form on which there is externally inserted the envelope or the budello to be filled in, the conduit being characterized by the fact that it is provided in proximity or at its extremity which is placed immediately upstream of the pincers which carry out the clipping operation, a plurality of cutting blades or knives, at least two in number, with a radial or diametrical course, the blades being reciprocally close to each other and at least one is capable of rotating around the axis of the delivery device.

In actual operation the product to be filled which is fed by means of a tubular conduit is going to be deposited within the container or budello which gradually slides out from the conduit as a result of being filled in.

When the pre-established quantity of the product has been filled, the metering machine or the machine which divides the product into portions is stopped and by means of the device of the present invention one of the knives which are close one to the other proceeds to rotate by 180° or 360°, preferably the knife which is placed more internally with respect to the extremity of the delivery device, whereby due to the cutting action exerted by the cutting corners having sharp edges of the movable knives against the cutting corners of the fixed knives, a net separation between the portion of the product which has been filled contained in the budello and the remaining part, which remains contained in the delivery conduit used for feeding the product, is obtained.

With this manner of operation the separation of the portion of the product which has been filled in from the remaining mass in addition to breaking the filiform residues in order to obtain a perfect surface of separation, the subsequent clipping operation is rendered easier because the product cannot go back during the formation of the neck and clipping of the budello, whereby the accuracy of the weight of the product which has been filled in is guaranteed.

Obviously the clipping operation carried out with machines conventionally known applies two clips contemporaneously, one in front which closes the product already packaged and another in the rear which constitutes the front closure of the new budello to be filled in.

BRIEF DESCRIPTION OF THE DRAWINGS

These and other characteristics of the invention will be better understood by reference to the description of a possible embodiment which is shown by way of illustration and is not intended to be limiting by reference to the accompanying drawings of which:

FIG. 1 is an elevational view in cross section of the device of the invention;

FIG. 2 is an exploded view of the end of the device of the invention;

FIG. 4 illustrates the filling in phase with the knives reciprocally aligned in order to facilitate the passage of the product to be filled in;

FIG. 5 illustrates the clipping phase and after the knives have been reciprocally rotated in order to achieve the separation of the product;

FIG. 6 is a transversal view in cross section according to line VI—VI of FIG. 4;

FIG. 7 is a transversal view in cross section according to line VII—VII of FIG. 5.

As shown in FIG. 1 the separating device of the present invention is constituted by an essentially tubular structure (1) which has at the end of the conduit (2) used for feeding the product (3) to be filled in, two cutting blades (4) and (5), the blades being disposed diametrically on the conduit (2), the blades being independent one from the other and being arranged close one to the other.

Figure 3:
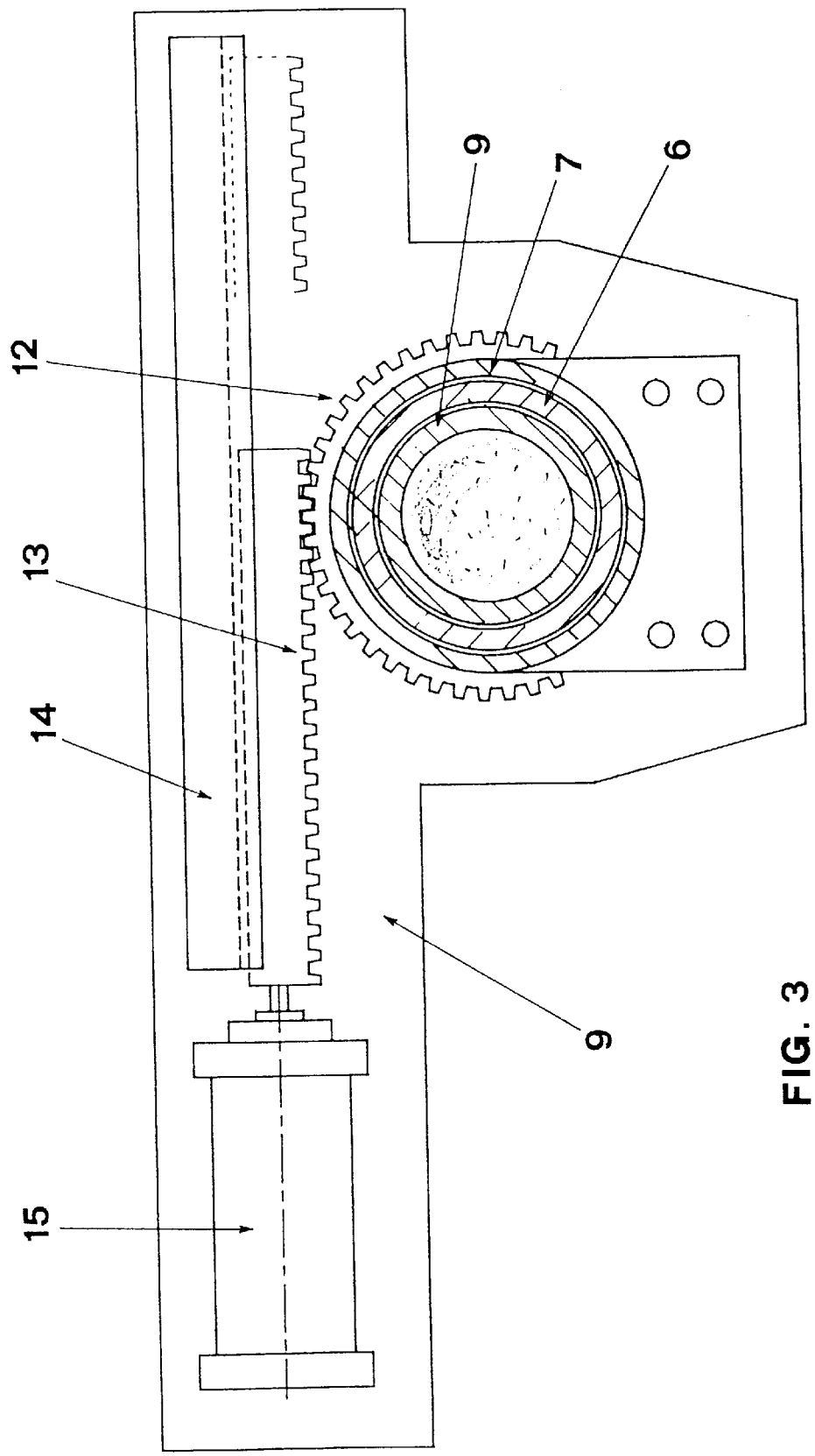
FIG. 3 is a side view of the device of the invention in cross section according to line III—III of FIG. 1.

The device according to the invention is first of all characterized by the fact that at least one of the two cutting blades is capable of rotating around the longitudinal axis of conduit (2) by at least 180°. Constructively this is achieved by providing the feeding conduit (2) to be constituted by two tubular structures (6) and (7) which are coaxial and which are telescoped one with respect to the other.

In more detail the two cutting blades (4) and (5) are anchored to the extremity of the respective tubular structures (6) and (7) and are blocked in a removable manner in order to be substituted by new blades due to wear and due to the different characteristics of the product to be filled in.

In addition, the tubular structure (6) which is disposed internally has the ability of rotating around the axis (8) of conduit (2) while the tubular structure (7) which is disposed externally is fixed and remains blocked on plate (9) which connects with the metering machine or with the machine which divides the product to be filled in in several portions, these machines not being shown in the drawings.

The envelope (10) constituted in general by a budello is inserted in the form of a bellows on the external tubular structure (7) and is closed at the end with a clip (11).

A possible constructive solution to cause the rotation of the tubular structure (6) is achieved by means of a transmission with a pinion and a rack. Specifically tubular structure (6) which is in the interior is provided with a toothed pinion (12) which engages with rack (13).

The alternative longitudinal displacement of rack (13) which slides within guide (14) and which is set in motion by the pneumatic cylinder (15), causes by means of pin (12) the rotation of the internal tubular structure (6) and therefore the rotation of the cutting blade (4) which is more in the interior.

In operation as shown in FIGS. 4 and 5 the product (3) which must be filled in, being introduced by a metering machine not shown in the drawing, is filled gradually in the container or in the budello (10) which slides out automatically because it is pushed by the same product exiting from the feeding conduit and begins to form the portion of the material already filled in designated by numeral (16).

During this phase of filling the budello the two cutting blades (4) and (5) are still, perfectly aligned and one placed above the other in such a manner as to reduce as much as possible the space in the section of passage of the feeding conduit.

Advantageously, the cutting blade (4) which is more in the interior is provided with a projection in the rear (17), the latter having an end which can be rounded or in the form of a wedge, with a cutting wire, the latter not being necessarily linear and which by breaking the mass of the product to be filled in facilitates the advance of the product.

When the metering machine or the machine which divides the product in portions has unloaded the required quantity of the product, the internal cutting blade (4) is placed in rotation, the latter separating in a net and complete manner the portion (18) of the product which has been placed in the budello from the remaining part of the product (19) which remains within the feeding conduit (2).

Due to the reciprocal sliding of the two blades (4) and (5) a net surface of separation (20) is formed. This surface facilitates the subsequent action of closure of the container or the clipping operation which is carried out by means of conventional machines, which provide for the application contemporaneously of two clips (21 and 22). At the end of the clipping operation the two clips (21) and (22) are separated one from the other thus obtaining the final inserted product (23).

On the basis of what is described hereinabove the advantages of the device according to the present invention are evident because the device permits to carry out the filling operation in a manner completely automatic, leaving to the operator only the function of inserting on the external tubular structure (7) the container or budello, which being packaged as a bellows form gives the result of substantial length, while permitting a very long working cycle which is advantageous from the point of view of productivity.

Obviously other changes are possible, for instance with cutting blades or knife having a different shape and integral or removable with the corresponding tubular structure while at the same time the features set forth in the main claim remain the same.

What is claimed is:

1. In a metering machine or a machine which divides the product to be filled in a container (10) and a clipping machine, a device (1) for the separation of the products already filled and the products to be filled, said products being melted and then resolidified, solid, in the form of a paste or dense products of different size, said products (3) being fed by a conduit (2) having an extremity and a longitudinal axis (8), the device being interposed between said metering machine or the machine which divides the product into portions on one hand and the clipping machine on the other hand, which closes the material already filled in, wherein said device has a substantially tubular structure, said device having at said extremity of said conduit (2) at least two cutting blades (4) and (5), said cutting blades being disposed in said conduit, said blades being reciprocally independent one from the other and being arranged close one to the other, said cutting blades being disposed diametrically on said conduit, one of said blades being capable of rotating around said longitudinal axis (8) of said conduit (2) by at least 180°, and wherein said conduit (2) is constituted by two coaxial tubular structures (6) and (7), said tubular structure (6) being disposed internally and being capable of rotating angularly around said axis (8), while tubular structure (7) is disposed externally and is fixed.

2. The device according to claim 1 wherein said structure (6) has an extremity and it supports at said extremity said cutting blade (4) which is placed upstream and in the most distant zone from the clipping machine.

3. The device according to claim 2, wherein said tubular structure (6) has a body and said cutting blade (4) is supported in a removable manner on said body of said tubular structure (6).

4. The device according to claim 2, wherein said cutting blade (4) is constituted by a body integral with said tubular structure (6).

5. The device according to claim 2, wherein the rotation of said tubular structure (6) is carried out by means of a pinion (12) and a rack (13) system, said system being activated by a transmission structure constituted by a pneumatic cylinder (15).

6. The device according to claim 1 which comprises a plate (9) and said fixed external tubular structure (7) is supported by said plate (9).

7. The device according to claim 6 wherein said external tubular structure (7) has an extremity and supports at said extremity said cutting blade (5), said blade (5) being placed upstream and in the area closer to said clipping machine.

8. The device according to claim 7 wherein said cutting blade (5) is supported in a removable manner on said tubular structure (7).

9. The device according to claim 8 wherein said cutting blade (5) is integral with said tubular structure (7).

10. The device according to claim 1 wherein said container (10) is inserted on one of said tubular structures.

11. The device according to claim 10 wherein said tubular structure is said external structure (7).

12. The device according to claim 11 wherein said container (10) is compressed in the form of a bellows on said tubular structure (7).

13. The device according to claim 3 wherein said cutting blade (4) has a rear and is provided in said rear with a protrusion (17), said protrusion being capable of facilitating the advance of said product (3) to be filled in.

14. The device according to claim 13 wherein said protrusion (17) has a rounded extremity.

15. The device according to claim 13 wherein said protrusion (17) has an extremity in the form of a wedge.

16. The device according to claim 13, wherein the cutting line of said protrusion (17) is variably curved.

17. The device according to claim 10 wherein during the operation of filling said container (10), the cutting blades (4) and (5) are still, perfectly aligned and one superimposed over the other.

18. The device according to claim 10, wherein after said container (10) is filled, it operates by rotation of said cutting blade (4), in a manner to generate a net surface of separation (20) between the portion of said product (18) which constitutes the final product already filled in (23) from the portion of the product (19) which remains in the interior of said feeding conduit (2).

* * * * *